US009909643B2

(12) United States Patent
Mahe

(10) Patent No.: US 9,909,643 B2
(45) Date of Patent: Mar. 6, 2018

(54) TORQUE TRANSMISSION DEVICE FOR A MOTOR VEHICLE

(71) Applicant: VALEO EMBRAYAGES, Amiens (FR)

(72) Inventor: Herve Mahe, Amiens (FR)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 14/835,440

(22) Filed: Aug. 25, 2015

(65) Prior Publication Data

US 2016/0069417 A1 Mar. 10, 2016

Related U.S. Application Data

(62) Division of application No. 14/035,126, filed on Sep. 24, 2013, now Pat. No. 9,115,765.

(30) Foreign Application Priority Data

Sep. 24, 2012 (FR) ...................................... 12 58945

(51) Int. Cl.
*F16F 15/123* (2006.01)
*F16D 3/62* (2006.01)
(Continued)

(52) U.S. Cl.
CPC ............ *F16F 15/1236* (2013.01); *F16D 3/12* (2013.01); *F16D 3/62* (2013.01); *F16D 3/66* (2013.01); *F16F 15/1202* (2013.01); *F16F 15/123* (2013.01); *F16F 15/12306* (2013.01); *F16F 15/12373* (2013.01); *F16F 15/145* (2013.01);
(Continued)

(58) Field of Classification Search
CPC ............. F16F 15/1236; F16F 15/12306; F16F 15/1202; F16F 15/30; F16F 5/123; F16F 15/12373; F16F 15/145; F16F 15/12346; F16D 3/66; F16D 3/12; F16D 3/62
USPC .................... 464/64.1, 68.7–68.92; 192/203, 192/213–213.3
See application file for complete search history.

(56) References Cited

U.S. PATENT DOCUMENTS 3,266,271 A 8/1966 Stromberg
4,698,045 A * 10/1987 Billet .................. F16F 15/1202
464/64.1 X
(Continued)

FOREIGN PATENT DOCUMENTS

EP 0308178 A2 3/1989
EP 0321121 A2 6/1989
WO 9102175 A1 2/1991

*Primary Examiner* — Gregory J Binda
(74) *Attorney, Agent, or Firm* — Berenato & White, LLC

(57) ABSTRACT

A torque transmission device for a motor vehicle, having a torque input element, a torque output element, and at least one pair of elastic members mounted between the torque input and output elements and counteracting rotation of input and output elements with respect to one another. The elastic members are arranged serially by means of a phasing member so that the elastic members deform in phase with one another. The stiffness K1 of the elastic member mounted between the torque input element and the phasing member is less than the stiffness K2 of the elastic member mounted between the phasing member and the torque output element, the ratio K2/K1 being equal to at least 2. One elastic member of the at least one pair of elastic members includes two coaxial helical springs mounted one inside the other.

17 Claims, 13 Drawing Sheets

(51) Int. Cl.
  *F16D 3/12* (2006.01)
  *F16D 3/66* (2006.01)
  *F16F 15/14* (2006.01)
  *F16F 15/12* (2006.01)
  *F16F 15/30* (2006.01)
  *F16H 45/02* (2006.01)

(52) U.S. Cl.
  CPC ............ *F16F 15/30* (2013.01); *F16H 45/02* (2013.01); *F16F 15/12346* (2013.01); *F16H 2045/0205* (2013.01); *F16H 2045/0226* (2013.01)

(56) References Cited

U.S. PATENT DOCUMENTS

| | | |
|---|---|---|
| 6,241,614 B1 | 6/2001 | Mizukami et al. |
| 2010/0269497 A1 | 10/2010 | Engelmann et al. |
| 2011/0031083 A1 | 2/2011 | Matsuoka et al. |
| 2012/0168270 A1 | 7/2012 | Takikawa et al. |
| 2012/0208647 A1* | 8/2012 | Takikawa ................ F16H 45/02 464/68.8 |
| 2012/0208648 A1* | 8/2012 | Takikawa ................ F16H 45/02 464/68.8 |

* cited by examiner

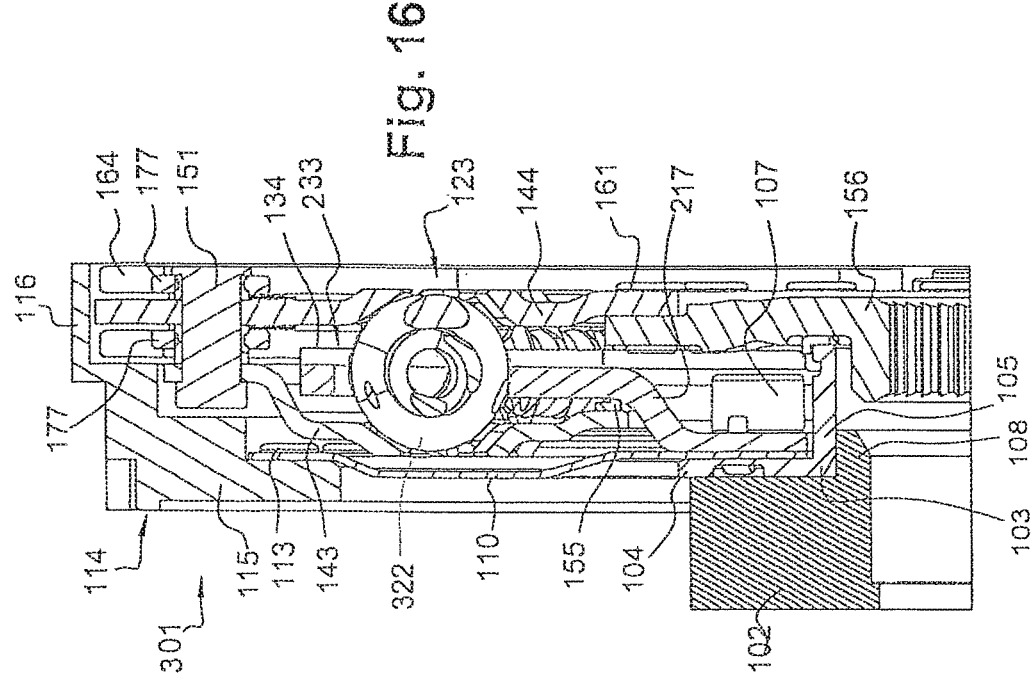
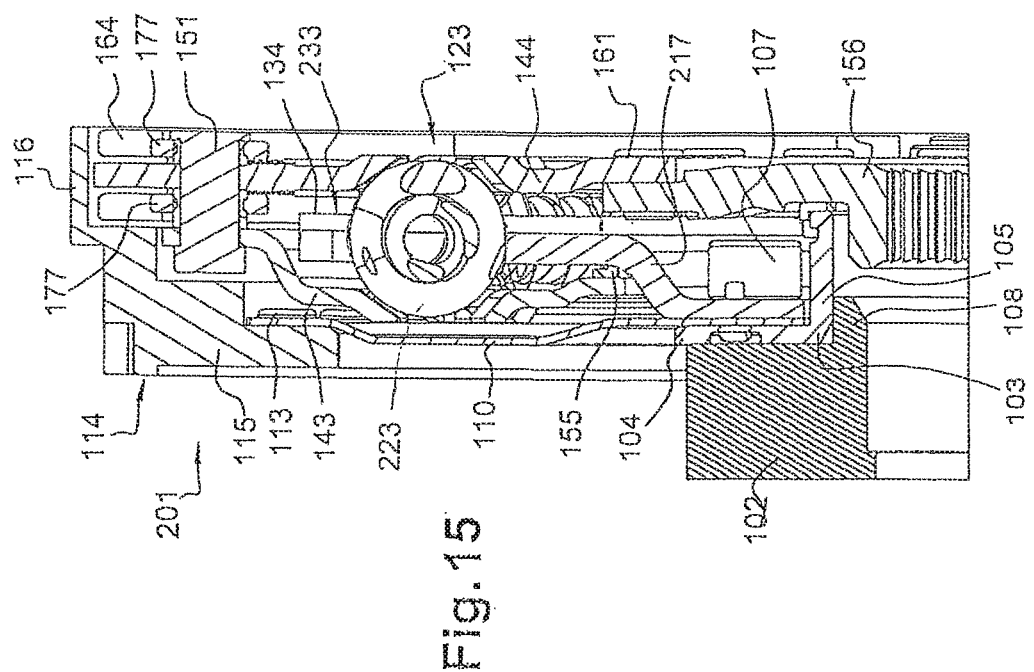

TORQUE TRANSMISSION DEVICE FOR A MOTOR VEHICLE

CROSS-REFERENCE TO RELATED APPLICATIONS AND CLAIM TO PRIORITY

This application is a division of application Ser. No. 14/035,126, filed Sep. 24, 2013, now U.S. Pat. No. 9,115,765, which relates to French Patent Application No. 1258945 filed Sep. 24, 2012, the disclosures of which are incorporated herein by reference and to which priority is claimed.

FIELD OF INVENTION

The present invention relates to a torque transmission device for a motor vehicle, such as e.g. a torque converter or a dual mass flywheel (DMF).

BACKGROUND OF THE INVENTION

Such a device has in general a torque input element, a torque output element, and elastic members mounted between the torque input and output elements and counteracting rotation of one of said elements with respect to the other.

When the torque transmission device is of the long travel damper (LTD) type, it comprises several groups of elastic members in which the elastic members of a single group are arranged serially by means of a phasing member so that the elastic members of each group deform in phase with one another.

The document US 2010/0269497 describes a hydraulic torque converter intended to couple an output shaft of an internal combustion engine, such as a crankshaft, to an input shaft of a gearbox.

The torque converter conventionally has a bladed impeller wheel capable of hydrokinetically driving a bladed turbine wheel via a reactor.

The impeller wheel is rotationally coupled to the crankshaft, and the turbine wheel is rotationally coupled to two guide washers. The latter are mounted movably around a central hub rotationally coupled externally to an annular web and intended to be coupled internally to the input shaft of the gearbox.

A clutch allows a torque to be transmitted from the crankshaft to the guide washers with no involvement by the impeller wheel and turbine wheel. This clutch has an input element coupled to the crankshaft and an output element, in the form of a splined hub, fastened to the guide washers.

Elastic members are mounted circumferentially between the annular web and the guide washers. These elastic members are grouped in pairs, the elastic members of a single pair being arranged serially by means of a common phasing member, so that the elastic members deform in phase with one another. The elastic members exhibit substantially the same stiffness constant.

Pendular damping means are mounted on the phasing member and have pendular masses fastened movably on the radially outer periphery of the phasing member.

The pendular damping means and the elastic members allow vibrations and rotational irregularities, due especially to the explosions of the internal combustion engine, to be absorbed and damped.

Pendular damping means of this kind can be used on other torque transmission devices, in particular such as dual mass flywheels.

It is known that a dual mass flywheel conventionally has a primary flywheel intended to be coupled to a crankshaft, and a secondary flywheel intended to be coupled to an input shaft of a gearbox by means of a dutch.

The two flywheels are rotationally movable with respect to one another, and are coupled in particular by means of elastic members. The stiffness constants of the elastic members are substantially identical to one another.

Pendular masses can be mounted on a support constituted by a movable element of the dual mass flywheel, for example a guide washer, an annular web, or a phasing member.

The masses are then mounted on the support, generally by means of guide rollers engaged into oblong circular-arc holes of the masses and of the support. The concavities of the mass holes are opposite the concavities of the support holes. The resulting motion of the masses is pendular, and depends on the shape of the oblong holes.

In operation, during rotation of the movable support on which the masses are mounted, the latter become displaced between two extreme positions.

In these torque transmission devices it has been found that the phasing members generally have a relatively low resonant frequency or natural frequency, so that they generate vibrations for engine speeds between, for example, 1000 and 1500 rpm; these vibrations can cause noise or can have a negative impact on the comfort of vehicle users.

BRIEF SUMMARY OF THE INVENTION

The object of the invention is in particular to provide a simple, effective, and economical solution to this problem.

For this purpose, it proposes a torque transmission device for a motor vehicle, having a torque input element, a torque output element, and at least two elastic members mounted between the torque input and output elements and counteracting rotation of one of said input and output elements with respect to the other, the elastic members being arranged serially by means of a phasing member so that the elastic members deform in phase with one another, wherein the stiffness K1 of the elastic member mounted between the torque input element and the phasing member is less than the stiffness K2 of the elastic member mounted between the phasing member and the torque output element, the ratio $K2/K1$ being equal to at least 2.

The higher the $K2/K1$ ratio, the higher the resonant frequency. The existence of a $K2/K1$ ratio equal to at least 2 thus allows the natural frequency of the phasing member to be raised sufficiently to prevent the latter from being excited at low engine speeds. The natural frequency of the phasing member can be reached, for example, only for engine speeds greater than 3000 or 4000 revolutions per minute.

In general, the existence of a relatively low stiffness K1 also allows the torque transmission device to improve filtering of vibrations and rotational irregularities. Since the stiffness K1 is located closest to the source of the vibrations, it allows those vibrations to be filtered more efficiently.

The ratio $K2/K1$ is by preference between 2 and 5, preferably between 2 and 3.

The minimum value of K1 (and thus the maximum value of the ratio $K2/K1$ is limited by several factors. A first factor is the installation space available for accommodation of the elastic members. Specifically, an elastic member present in the form of a helical spring, for example, will have a stiffness that decreases as its number of turns and length increase.

Another factor is that the elastic members of stiffness K1 must have sufficient stiffness to be able to transfer the engine torque from the torque input element to the torque output element.

The value of the ratio K2/K1 is thus the result of a compromise aimed both to impart a sufficiently high natural frequency to the phasing member, and to conform to the aforesaid torque transfer and installation space constraints.

According to a characteristic of the invention, the device has pendular damping means comprising at least one pendular mass mounted movably on the phasing member, on the torque input element, or on the torque output element.

As indicated previously, the invention makes it possible to minimize the amplitude of the oscillations of the phasing member, and thus the required deflection of the pendular masses on the phasing member, on the torque input member, or on the torque output member. This offers the advantage of improving filtering of vibrations and of rotational irregularities. A K2/K1 ratio greater than 2 reduces the vibrations that arrive at the phasing member, so there is less load on the pendular masses. A lower load on the pendular masses then allows their behavior (travel, mass, etc.) to be optimized.

Advantageously, the elastic members are helical compression springs; the torque input element, torque output element, and/or phasing member have stop means designed to limit the compression of the springs and prevent the turns of the springs from becoming contiguous upon compression.

According to an embodiment of the invention, the torque transmission device is present in the form of a torque converter.

According to another embodiment of the invention, the torque transmission device is present in the form of a dual mass flywheel.

BRIEF DESCRIPTION OF THE DRAWINGS

The invention will be better understood, and other details, characteristics, and advantages of the invention will become apparent, upon reading the description below provided as a non-limiting example, referring to the attached drawings in which:

FIG. 15 is a sectional view of the device of FIG. 11 taken along the line 15 of FIG. 11, FIG. 16 is a sectional view of the device of FIG. 13 taken along the line 16 of FIG. 13.

DETAILED DESCRIPTION OF EXEMPLARY EMBODIMENT(S) AND EMBODIED METHOD(S) OF THE INVENTION

Figure 1:
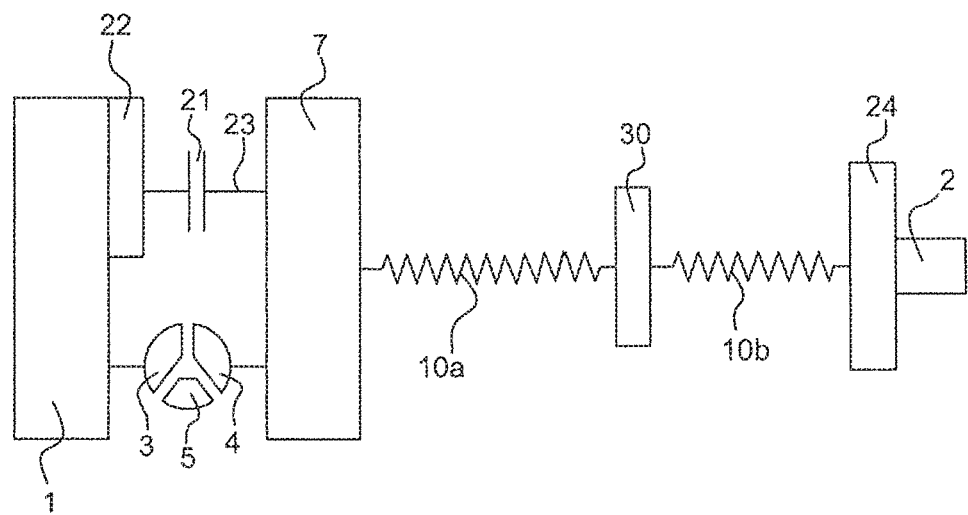
FIG. 1 is a schematic view of a torque transmission device according to the present invention, present in the form of a hydrodynamic torque converter.

A hydrodynamic torque converter according to the invention is depicted schematically and partially in FIG. 1. This converter allows a torque to be transmitted from an output shaft of an internal combustion engine of a motor vehicle, for example a crankshaft 1, to an input shaft 2 of a gearbox.

The torque converter conventionally has a bladed impeller wheel 3 capable of hydrokinetically driving a bladed turbine wheel 4 via a reactor 5.

Impeller wheel 3 is coupled to crankshaft 1, and turbine wheel 4 is coupled to a turbine hub 6 that is in turn coupled to two guide washers 7, hereinafter referred to respectively as rear guide washer 7a and front guide washer 7b.

Front guide washer 7b and turbine hub 6 are mounted rotatably around a central splined hub 8 intended to be coupled to input shaft 2 of the gearbox.

Front guide washer 7b is mounted around turbine hub 6 and fastened thereto. The two guide washers 7a, 7b extend radially, and delimit between them an internal space 9 accommodating elastic members 10a, 10b that are, for example, helical compression springs.

Rear guide washer 7b has a cylindrical rim 11 at its radially outer periphery, extending toward front guide washer 7a and fastened thereto.

The free end of cylindrical rim 11 has notches 12 (FIG. 4) serving to receive positioning and centering pegs 13 extending from the radially outer periphery of front guide washer 7a.

The free end of cylindrical rim 11 furthermore has lugs 14 that extend axially before the two guide washers 7a, 7b are fastened to one another. These lugs 14 are folded down onto the outer periphery of front guide washer 7a during a riveting operation, and can be welded to the latter, in order to ensure fastening of the two guide washers 7a, 7b. It is noteworthy that in the embodiment depicted in the Figures, each lug 14 is positioned circumferentially between two pegs 13.

Guide washers 7a, 7b have, conventionally, windows 15 serving to accommodate elastic members 10a, 10b.

At least one of guide washers 7a, 7b, here the front guide washer 7a, has projecting elements 16, 17, for example six in number, present in the form of portions deformed by embossing, projecting toward rear washer 7b. Each projecting element 16, 17 has two opposite stop surfaces labeled respectively 16a, 16b and 17a, 17b.

Figure 2:
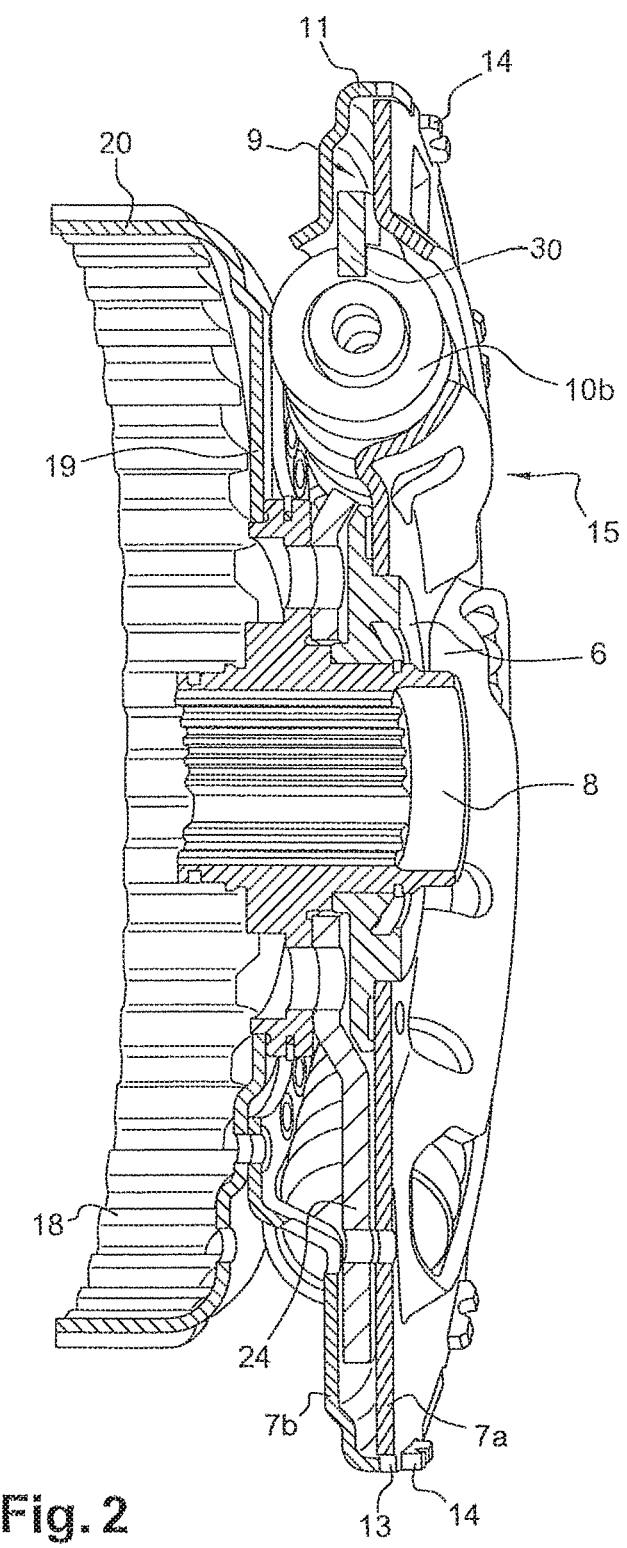
FIG. 2 is a longitudinally sectioned perspective view of a part of the device of FIG. 1 taken along the line 2-2 of FIG. 3.

A splined hub 18 (FIG. 2) is likewise fastened on the rear surface of rear guide washer 7b. This splined hub 18 has a radial part 19 fastened onto said rear surface of rear guide washer 7b, and a splined cylindrical rim 20 extending toward the rear from the radially outer periphery of radial part 19.

A clutch 21 (FIG. 1) allows a torque to be transmitted from crankshaft 1 to guide washers 7 in a specific operating phase, with no involvement by impeller wheel 3 and turbine wheel 4. This clutch 21 has an input element 22 coupled to crankshaft 1, and an output element 23 having splined hub 18.

A radially extending annular web 24 is mounted in the internal space and is fastened on central hub 8 by means of rivets.

Figure 3:
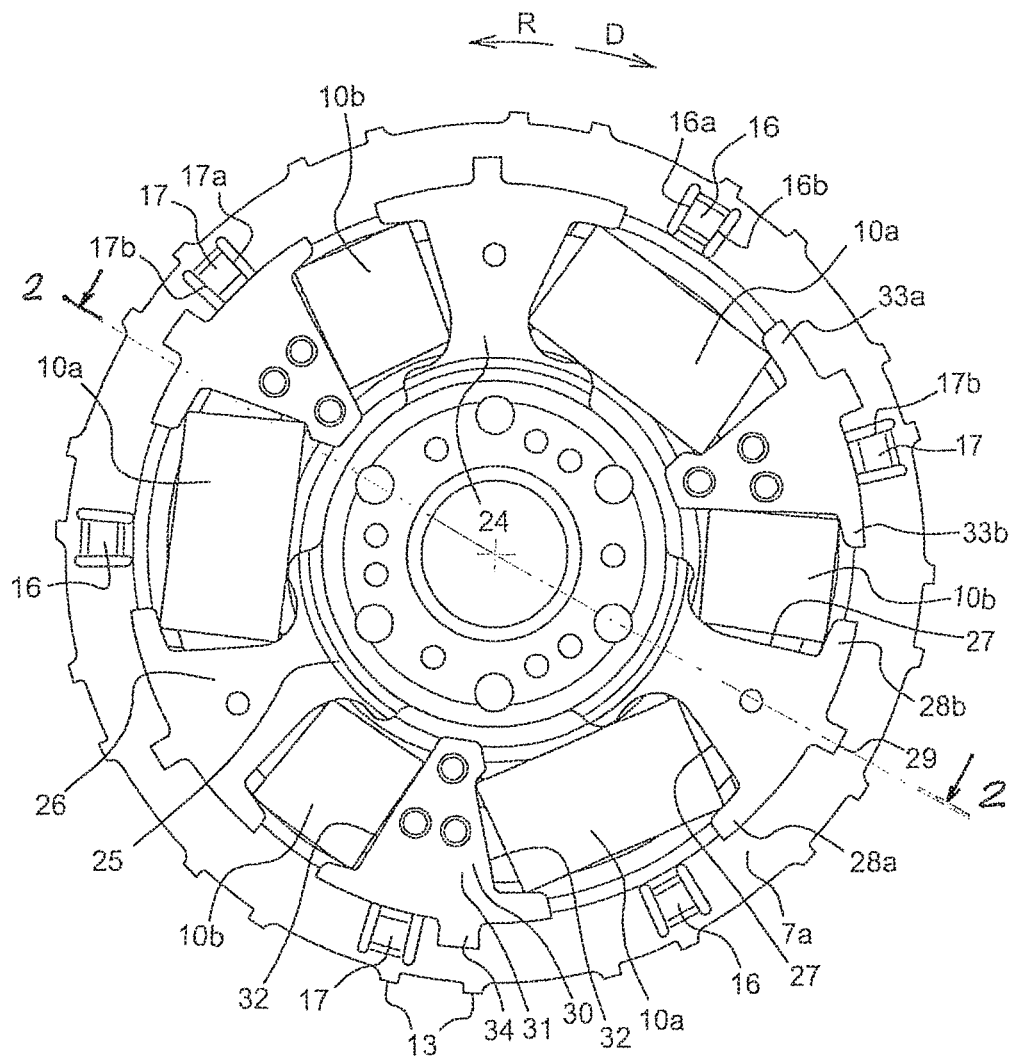
FIG. 3 is a frontal view of a part of the device of FIGS. 1 and 2.
Figure 4:
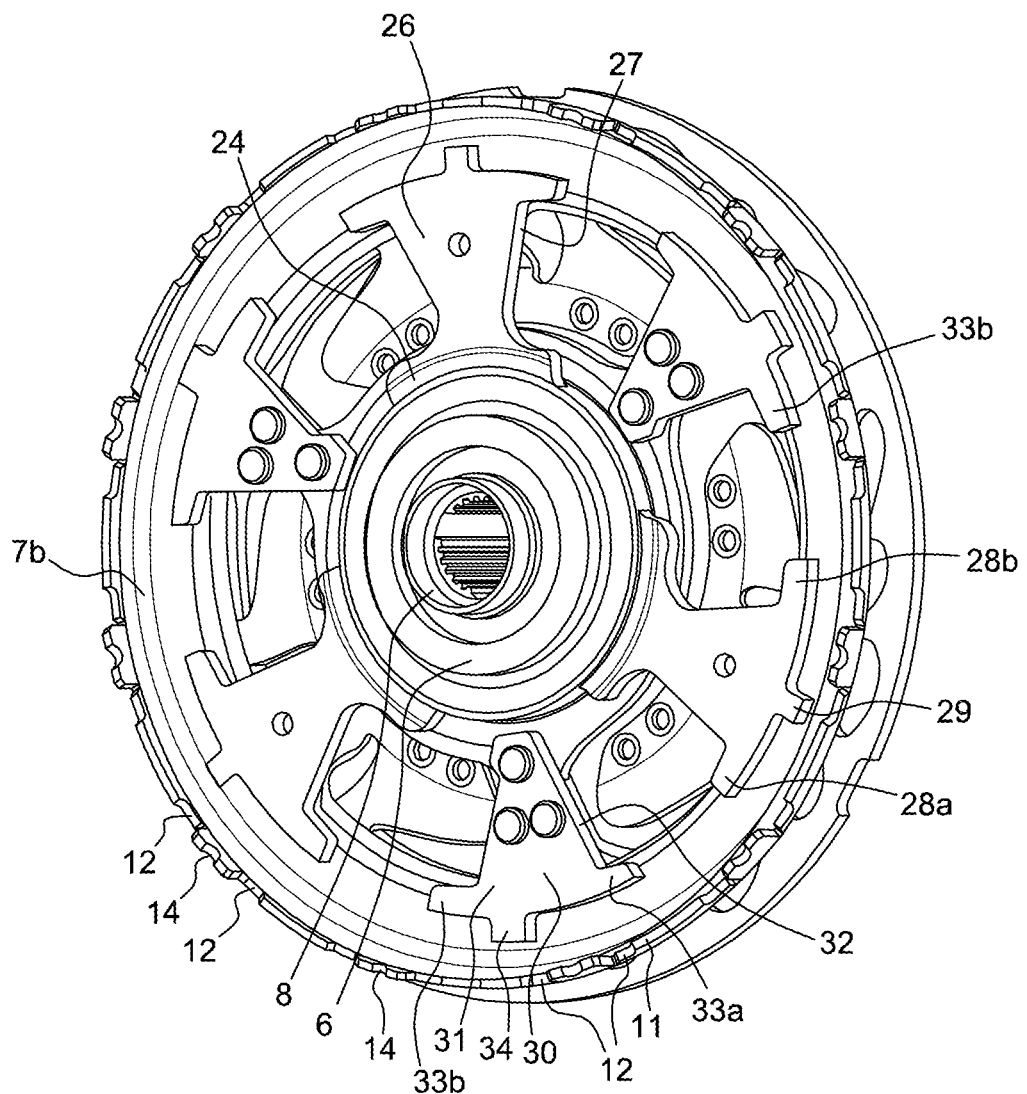
FIG. 4 is a perspective view of a part of the device of FIGS. 1 to 3.

Annular web 24 has a radially inner annular part 25 from which tabs 26, for example three in number, extend radially outward (FIGS. 3 and 4). Each tab 26 has two opposite surfaces 27 serving to support elastic members 10a, 10b that are inclined with respect to one another and to the radial direction. Two stop blocks 28a, 28b extend circumferentially on either side of each tab 26 at the level of its outer periphery. Each tab 26 moreover has on its outer periphery a stop block 29 extending radially outward.

Elastic members 10a, 10b are mounted circumferentially between annular web 24 and guide washers 7a, 7b.

More particularly, elastic members 10a, 10b are arranged in pairs. The elastic members of a single pair are disposed serially by means of a common phasing member 30, so that elastic members 10a, 10b deform in phase with one another. In the embodiment depicted in the Figures, the torque converter has three pairs of elastic members 10a, 10b.

Thus, for each pair of elastic members 10a, 10b, depending on the rotation direction of guide washers 7a, 7b with respect to annular web 24, one of the elastic members (for example, 10a) is intended to become braced on the one hand against the corresponding end of windows 15 of guide washers 7a, 7b, and on the other hand against phasing member 30. The other elastic member (for example, 10b), is then intended to become braced on the one hand against phasing member 30 and on the other hand against one of the surfaces 27 of the corresponding tab 26 of annular web 24.

The phasing member 30 is only partly visible, and has an annular part (not visible) on which bracing members 31 (three in number here) are fastened by means of rivets. Each bracing member 31 extends radially from the annular part and has two circumferentially opposite surfaces 32 that serve to brace elastic members 10a, 10b and are inclined with respect to one another and with respect to the radial direction. As illustrated in FIG. 3, one of the opposite surfaces 32 of each of the bracing members 31 braces the elastic member 10a, while another of the opposite surface 32 of each of the bracing members 31 braces the elastic member 10b. Two stop blocks 33a, 33b extend circumferentially on either side of each bracing member at the level of its outer periphery. Each bracing member 31 furthermore has, on its outer periphery, a stop block 34 extending radially outward. Each pair of the elastic members 10a, 10b is disposed circumferentially opposite to each other relative to the phasing member 30 and is positioned circumferentially along substantially the same radius.

Stop blocks 28a, 28b of tabs 26 of annular web 24 are capable of becoming braced respectively against stop blocks 33a, 33b of bracing members 31 of phasing member 30.

Annular web 24 and phasing member 30 thus each have three blocks 28a, 28b, 29 and 33a, 33b, 34, and front guide washer 7a has six projecting elements 16, 17 intended to interact during operation with blocks 29, 34 of annular web 24 and of phasing member 30.

In an embodiment that is not depicted, phasing member 30 can furthermore have pendular masses intended to improve the filtering of vibrations and of rotational irregularities.

Projecting elements 16 can be distributed over the circumference of one of the two guide washers, projecting elements 17 then being distributed over the other of the guide washers.

In the preferred embodiment, projecting elements 16, 17 are distributed over the circumference of one of the two guide washers (or the front guide washer) in two groups, blocks 29 of annular web 24 being capable of becoming braced against first surfaces 16a of projecting elements 16 of a first group in a first rotation direction (called the "forward direction," represented by arrow D in FIG. 3), and against first surfaces 17a of projecting elements 17 of a second group in a second, opposite rotation direction (called the "reverse direction," represented by arrow R). Similarly, blocks 34 of phasing member 30 are capable of becoming braced against second surfaces 16b of projecting elements 17 of the second group in a first rotation direction (forward direction), and against second surfaces 16b of projecting elements 16 of the first group in a second, opposite rotation direction (reverse direction).

Blocks 28a, 28b, 29, 33a, 33b, 34 and projecting elements 16, 17 are positioned and dimensioned so as to limit the compression of elastic members 10a, 10b and, in the context of helical springs, to prevent the spring turns from becoming contiguous when they are compressed, regardless of the operating mode of the torque converter.

The stiffness K1 of each elastic member 10a mounted between guide washers 7a, 7b and phasing member 30 is less than the stiffness K2 of each elastic member 10b mounted between phasing member 30 and annular web 24. The ratio K2/K1 is equal to at least 2, more particularly is between 2 and 5, and preferably is between 2 and 3.

In the embodiment depicted in the Figures, elastic members 10a, 10b are helical compression springs. The length and the number of turns of springs 10a are greater than those of springs 10b, so that the stiffness of springs 10a is less than that of springs 10b. As an example, K1 is on the order of 5 N/°$ and K2 is on the order of 15 N/°. In another application, K1 can be equal to 20 N/° and K2 can be equal to 60 N/°.

As indicated previously, this allows the natural frequency of the phasing member to be raised sufficiently to prevent the latter from being excited at low engine speeds. The natural frequency of the phasing member can be reached, for example, only at engine speeds greater than 3000 or 4000 revolutions per minute.

In general, the existence of a relatively low stiffness K1 also allows the torque transmission device to improve filtering of vibrations and of rotational irregularities.

FIGS. 5 to 10 illustrate a torque transmission device present in the form of a dual mass flywheel (DMF) known from the Applicant's as-yet unpublished patent application FR 12 51107.

It has a torque input element comprising an engine flywheel 101 intended to be coupled directly to an engine shaft, for example a crankshaft 102 of a heat engine.

Engine flywheel 101 has a central hub 103 (which will be referred to in hereinafter in the description as "primary hub" 103) comprising a radial annular part 104 whose radially inner periphery is extended toward the front by a cylindrical annular part 105. Holes 106 are configured in the radial annular part and are regularly distributed over the entire circumference. Fastening screws 107, engaged into holes 106, allow primary hub 103 to be fastened to the end of engine crankshaft 102.

The end of crankshaft 102 has a cylindrical guide zone 108 engaged inside primary hub 103 in order to ensure centering of primary hub 103 on the end of crankshaft 102.

The aforementioned screws 107 also become engaged into holes 109 configured on the radially inner periphery of a flexible annular plate 110 that is elastically and axially deformable. The annular plate has annular arched zones 111 (FIGS. 5 and 7), as known per se. Annular plate 110 allows some of the vibrations generated by the engine, and transmitted by crankshaft 102, to be filtered.

Holes 112 are furthermore configured on the radially outer periphery of the flexible plate, and are intended for fastening, by means of rivets 113, to an annular inertial mass 114.

More particularly, the inertial mass has a radially extending part 115 whose outer peripheral edge is extended toward the front by a cylindrical rim 116.

The assemblage formed by inertial mass 114, flexible plate 110, and primary hub 103 is called the "engine flywheel" or "primary flywheel." As a variant, this assemblage can be constituted by a single part.

The aforementioned screws 107 likewise come into engagement in holes configured on the radially inner periphery of an annular web 117. The heads of screws 107 become braced against the front surface of annular web 117.

Figure 7:
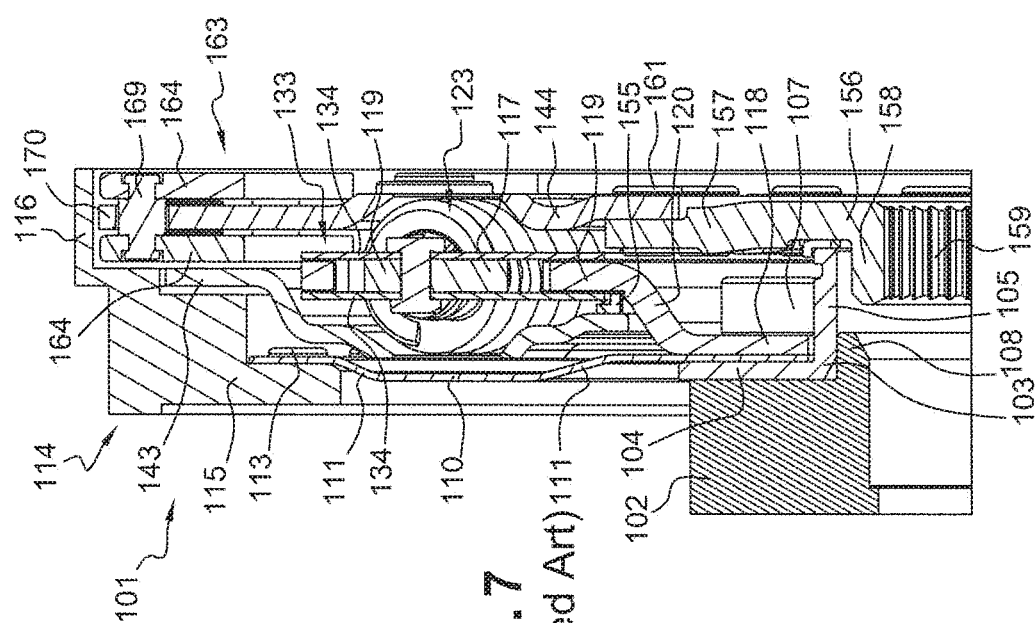

Annular web 117 has a radially inner part 118 in which the aforementioned holes are configured, and a radially outer part 119, connected by a frustoconical part 120 that flares out toward the front (FIG. 7). Radially outer part 119 is thus offset axially toward the front with respect to radially inner part 118.

The annular web 117 has at least two windows 121 serving to accommodate at least two groups of elastic members 122, 123. In the embodiment depicted in FIGS. 5 to 10, annular web 117 has three windows 121 (FIG. 5) extending circumferentially in the radially outer part and serving to accommodate three groups (or pairs) of elastic members 122, 123, each group being constituted by two elastic members 122, 123 arranged serially, as will be better described below.

Each elastic member 122, 123 can have two coaxial springs 124, 125 (FIG. 9) mounted one inside the other. These springs 124, 125 are helical compression springs that are straight, i.e. that extend in substantially rectilinear fashion.

Figure 5:
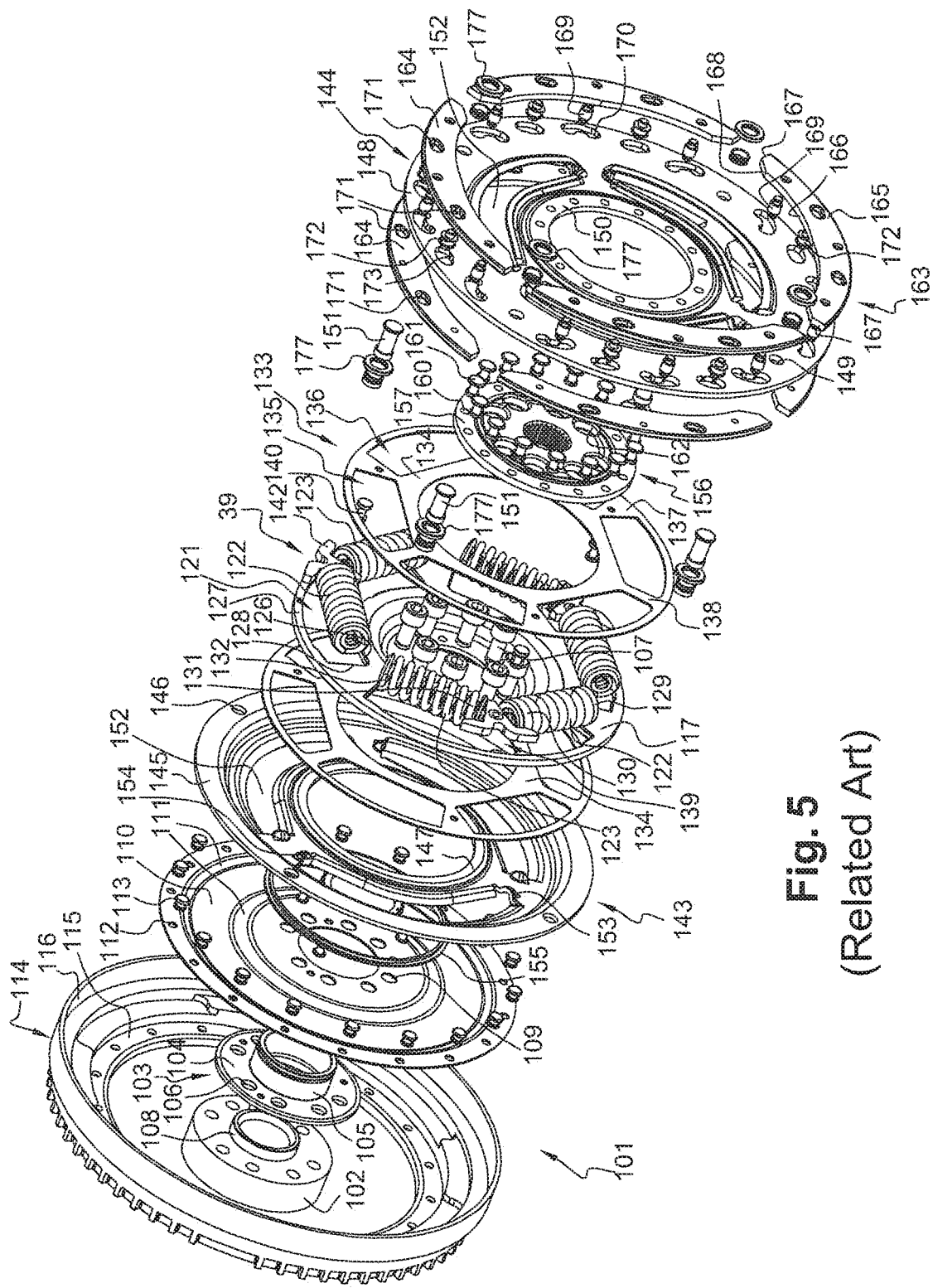
FIG. 5 is an exploded view, in perspective, of a torque transmission device present in the form of a dual mass flywheel, in accordance with the existing art.

The windows have an inner curved edge 126, an outer curved edge 127, and globally radial end edges 128 intended to brace the elastic members 122, 123 (FIG. 5). These end edges 128 can form an angle with the radial direction.

The circumferential ends of windows 121 exhibit constricted radial dimensions in order to ensure that ends 129, 132 of elastic members 122, 123 are kept radially in position. Conversely, the central zones of windows 121 exhibit a larger radial dimension so that the straight elastic members 122, 123 do not rub against radially outer edge 127 during operation.

The engine flywheel and annular web 107 form the torque input element.

As indicated previously, the elastic members 122, 123 of a single group are mounted serially by means of a phasing member 133. Each pair of the elastic members 122, 123 is disposed circumferentially opposite to each other relative to the phasing member 133 and is positioned circumferentially along substantially the same radius.

In the embodiment depicted in FIGS. 5 to 10, phasing member 133 has two radial plates 134 extending on either side of radially outer zone 119 of annular web 117.

Each plate 134 has at least two pairs of windows 135, 136, each window 135, 136 being intended to accommodate one elastic member 122, 123. In FIG. 5, each plate 134 has three pairs of windows. Each plate 134 thus has a radially inner ring and a radially outer ring, connected by six radial tabs 137, 138. Three of these tabs, labeled 137, serve to fasten three bracing elements 139 by means of rivets 140. Each bracing element 139 has two substantially planar and opposite bracing surfaces 141 that form an angle between one another and serve to brace ends 130, 131 of elastic members 122, 123.

Each bracing element 139 furthermore has, on its radially outer edge, two opposite tabs 142 extending on either side in order to form stops that limit the outward displacement of ends 130, 131 of elastic members 122, 123 that become braced against bracing element 139.

The ends of elastic members 122, 123 are thus kept radially in position by the constricted ends of windows 121 of annular web 117 and by the aforesaid tabs 142 of bracing elements 139.

During installation, elastic members 122, 123 are preloaded within windows 121 of annular web 117. In other words, during installation, each elastic member 122, 123 has one end 129, 132 braced against an end edge 128 of window 121, and one end 130, 131 braced against a bracing surface 141 of a bracing element 139.

During operation, each group of elastic members 122, 123 is intended to be compressed between annular web 117 on the one hand, and guide washers 143, 144 of the torque output element on the other hand.

In a first rotation direction, ends 129 of elastic members 122 thus become braced against annular web 117 of the torque input element, and ends 132 of elastic members 123 become braced against guide washers 143, 144 of the torque output element. In a second rotation direction opposite to the first, ends 129 of elastic members 122 become braced against guide washers 143, 144 of the torque output element, and ends 132 of elastic members 123 become braced against guide washers 143, 144 of the torque output element.

A first guide washer 143, called "rear guide washer" 143, has a radially outer periphery 145 in which holes 146 are configured, and a radially inner periphery 147 offset axially toward the rear with respect to radially outer periphery 145 (FIG. 5).

A second guide washer 144, called "front guide washer" 144, has a radially outer periphery 148 in which holes 149 are configured, and a radially inner periphery 150 offset axially toward the front with respect to radially outer periphery 149 (FIG. 5).

Holes 146, 149 of guide washers 143, 144 serve for the passage of rivets 151 (FIGS. 5 and 10) that, in particular, allow the two guide washers 143, 144 to be fastened to one another.

The radially middle parts of guide washers 143, 144 each have at least two windows 152 (three, in the embodiment depicted), extending circumferentially and each intended to accommodate a group of elastic members 122, 123. Windows 152 of front guide washer 144 are arranged facing toward windows 152 of rear guide washer 143.

The circumferential ends of windows 152 have radial bracing zones 153 and 154 (FIG. 5) intended respectively to brace ends 129 and 132 of elastic members 122, 123, depending on the rotation direction of the torque output element with respect to the torque input element.

Elastic members 122, 123 are thus arranged between the torque input element and the torque output element in order to damp and absorb vibrations and rotational irregularities.

A friction ring 155, of generally L-shaped section, is mounted axially between radially inner periphery 147 of rear guide washer 143 and annular web 117.

A hub 156, hereinafter called "secondary hub" 156, is fastened in radially inner periphery 150 of second guide washer 144. Secondary hub 156 has an annular radial part 157 whose radially inner edge is extended toward the rear by a cylindrical annular part 158 having, internally, splines 159 (FIG. 7) intended to interact with the splines of an output shaft, in turn intended to be coupled to an input element of a dutch or of a torque converter, for example.

Annular radial part 157 has, on its radially outer periphery, holes 150 serving to fasten it by means of rivets 161 into front guide washer 144. Annular radial part 157 furthermore has, in a middle zone, holes 162 serving for the passage of tightening screws or of a tool for tightening or loosening screws 107 for fastening the torque input element onto crankshaft 102.

Guide washers 143, 144 and secondary hub 156 constitute the torque output element.

Pendular damping means 163 are mounted on the torque output element, more specifically on front guide washer 144.

Pendular damping means 163 have at least two pairs of masses or flyweights 164 (four, in the embodiment depicted) of generally circular-arc shape, mounted on outer radial periphery 148 of front guide washer 144.

Masses 164 of a single pair are mounted on either side of front guide washer 144, facing toward one another.

Each mass 164 has an outer peripheral edge 165 extending facing toward the radially outer periphery of front guide washer 144, an inner peripheral edge 166, and radial circumferential ends 167 (FIG. 5). Circumferential ends 167 are connected to inner peripheral edge 166 by flat zones 168 forming an angle, for example on the order of 45°, with radial circumferential ends 167.

Masses 164 of a single pair are fastened to one another by three rivets 169 that also perform a spacing function. The distance between masses 164 that are held by rivets 169 is greater than the thickness of front guide washer 144 in its radially outer part 148, in order to limit friction between masses 164 and front guide washer 144.

A rivet 169 is disposed in the proximity of each of the circumferential ends of masses 164, another rivet 169 being located in the middle part of said masses 164.

Figure 6:
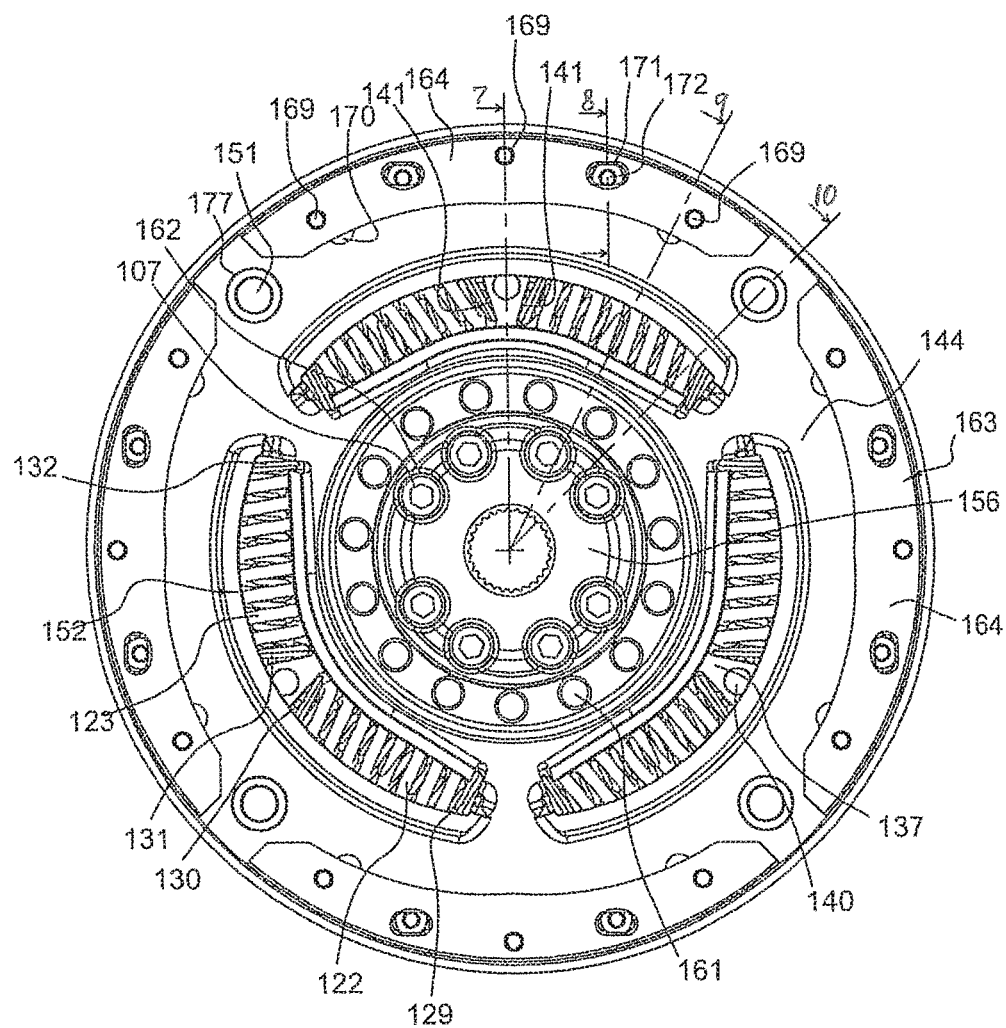
FIG. 6 is a frontal view of the device of FIG. 5, FIGS. 7, 8, 9, and 10 are sectioned views of the device of FIGS. 5 and 6, respectively along lines 7, 8, 9, and 10 of FIG. 6.
Figure 8:
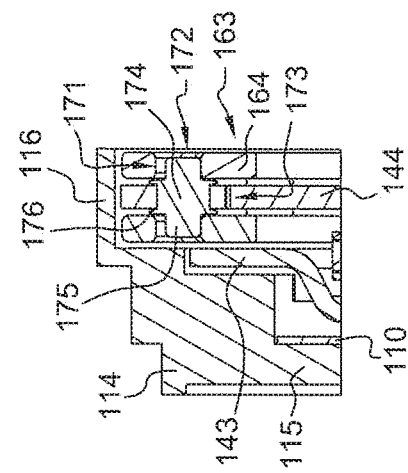

Each of rivets 169 passes through an oblong hole 170, in the general shape of a circular arc, of front guide washer 144 (FIGS. 5, 6, and 7). These circular-arc holes 170 exhibit a concavity turned radially inward. The dimensions of holes 170 are such that, during operation, rivets 169 do not come into contact with the edges of said oblong holes 170, for the reasons presented below.

Each mass furthermore has two oblong holes 171 in the general shape of a circular arc whose concavity is turned radially outward, each disposed circumferentially between two rivets 169. Holes 171 of a mass 164 are disposed facing toward holes 171 of the opposite mass 164. These holes 171 serve for mounting, with clearance, of guides or rollers 172 extending axially from one mass to the other, through oblong holes 173 in the form of a circular arc whose concavity is turned radially inward, configured in front guide washer 144.

Each roller 172 comprises a cylindrical central zone 174 (FIG. 8), cylindrical end zones 175 of a smaller diameter than central zone 174, and two collars 176 extending radially outward and delimiting central zone 174 of each of the end zones 175.

The diameter of collars 176 is less than the radial dimension of oblong holes 173 of front guide washer 144, in order to permit installation of rollers 172 into holes 173.

A central zone 174 is intended to roll on the peripheral edge of circular-arc hole 173 corresponding to front guide washer 144, and end zones 175 are intended to roll on the edges of the corresponding circular-arc holes 171 of masses 164. Collars 176 are intended to become interposed between masses 164 and front guide washer 144 in order to limit friction upon displacement of masses 164 with respect to front guide washer 144.

It is apparent that during operation, rollers 172 and masses 164 are pushed outward in response to centrifugal force.

Figure 10:
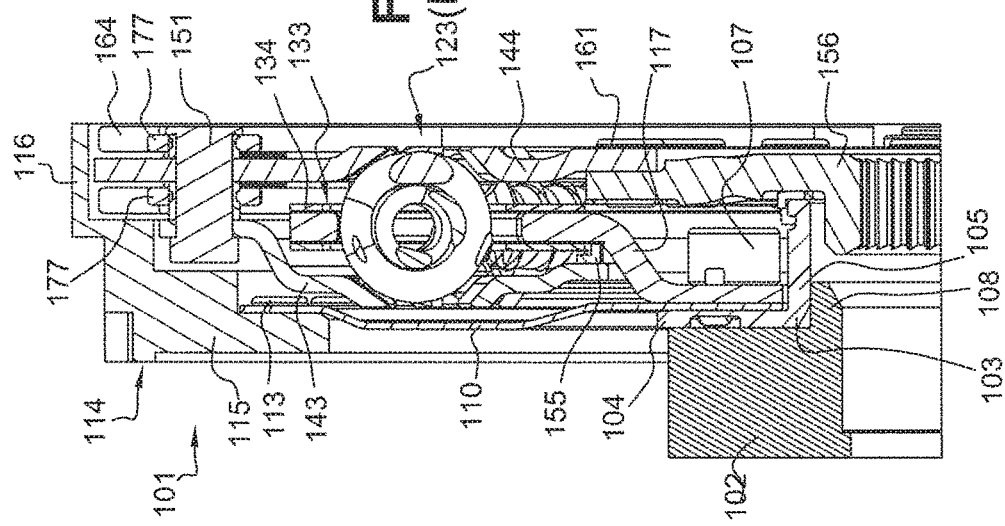
Figure 9:
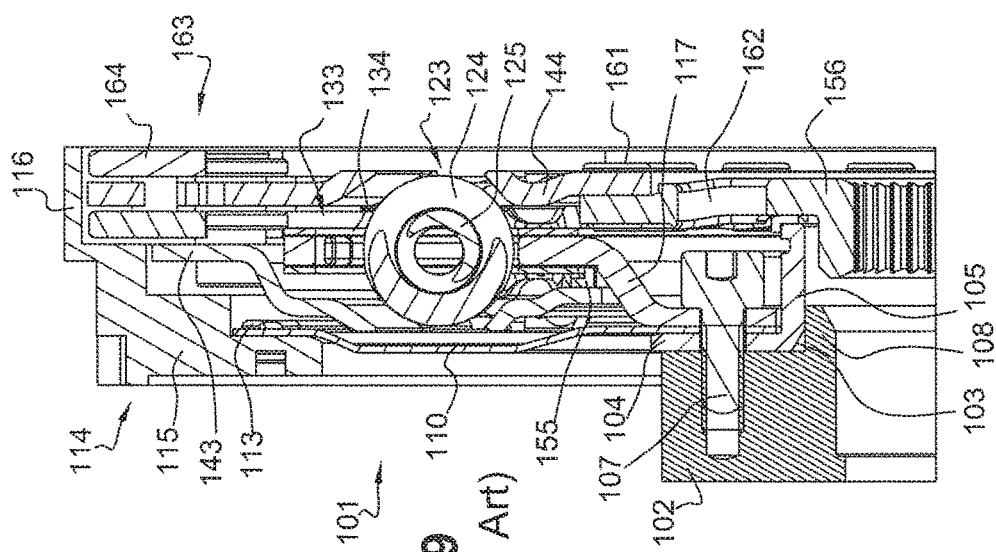

Front guide washer 144 is moreover equipped, on either side, with stop members each disposed circumferentially between two adjacent masses. The stop members have elastomeric rings 177 connected two by two by means of fastening rivets 151 of guide washers 143, 144 (FIGS. 6 and 10). During operation, the displacement of masses 164 is limited by the stop organs, by bracing of zones 168 against elastomeric rings 177. The dimensions and positioning of the various elements are such that masses 164 become braced against stop members 177 before rollers 172 or rivets 169 come to a stop against the circumferential ends of circular-arc holes 171, 170, 173 of masses 164 and of front guide washer 144. This allows noise during operation to be limited.

Masses 164 are thus mounted movably on front guide washer 144 in the manner of pendulums, the trajectory of masses 164 being defined by the shape of circular-arc holes 173, 171 configured in front guide washer 144 and in masses 164.

As is known per se, pendular damping means 163 allow the vibrations transmitted to the output shaft to be limited.

It is apparent that inertial mass 114, and more particularly its rim 116, cover annular web 117, elastic members 122, 123, guide washers 143, 144, secondary hub 156, and pendular damping means 163.

Figure 11:
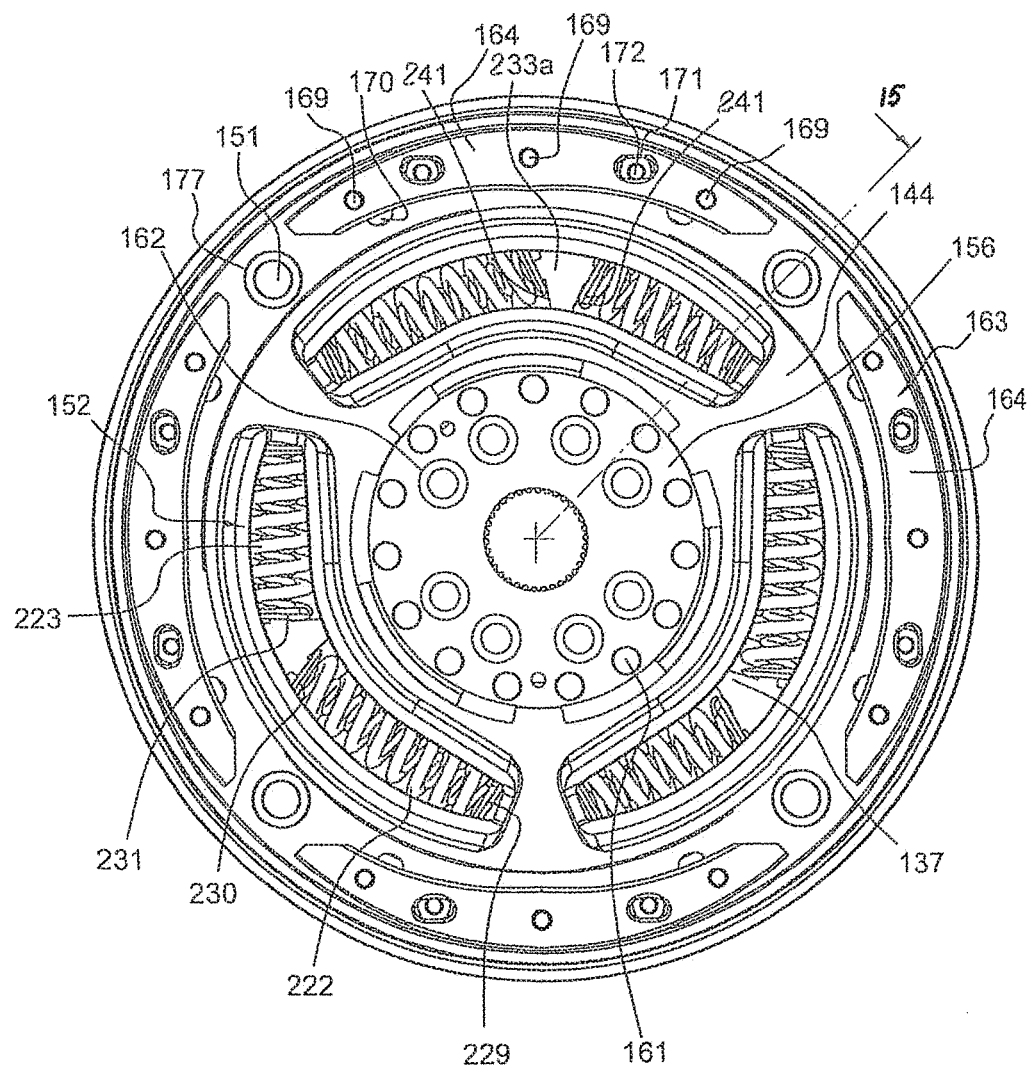
FIG. 11 is a view corresponding to FIG. 6, illustrating an embodiment of the invention.
Figure 12:
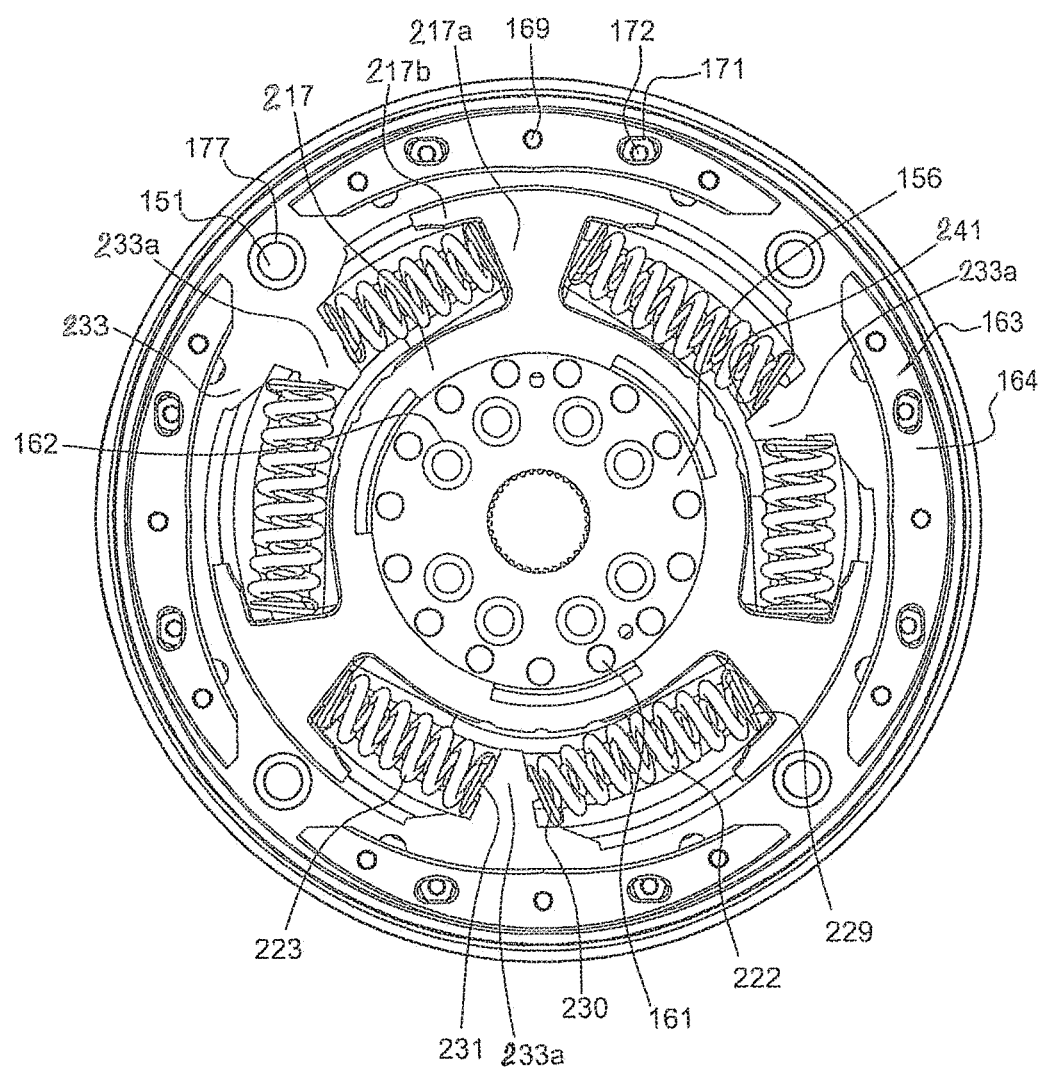
FIG. 12 is a view corresponding to FIG. 11, in which one of the guide washers has been removed.

FIGS. 11, 12 and 15 illustrate a dual mass flywheel 201 according to a first embodiment that differs from the dual mass flywheel 101 of FIGS. 5 to 10 in terms of the characteristics presented below. Components, which are unchanged from the embodiment of FIGS. 5-10, are labeled with the same reference characters. Components, which function in the same way as in the embodiment of FIGS. 5-10 are designated by the same reference numerals to which 100 has been added, sometimes without being described in detail since similarities between the corresponding parts in the two embodiments will be readily perceived by the reader.

An annular web 217 has a radially inner part from which extend tabs 217a serving to brace elastic members 222, 223, and rims 217b extend circumferentially on either side of the radially outer periphery of each of tabs 217a. Despite this slight difference in structure compared with the existing art, the role and the operation of annular web 217 remain unchanged.

In addition, a phasing member 233 is implemented in monobloc fashion and has an outer annular part from which tabs 233a extend radially outward so as to form bracing surfaces 241 of elastic members 222, 223. As previously, despite this slight difference in structure compared with the existing art, the role and operation of phasing member 233 remain unchanged.

The principal difference as compared with the existing art is the fact that the stiffness K1 of each elastic member 222 is less than the stiffness K2 of each elastic member 223. The ratio K2/K1 is equal to at least 2, more particularly is between 2 and 5, and preferably is between 2 and 3.

In the embodiment of FIGS. 11 and 12, each elastic member 222, 223 has two coaxial springs mounted one inside the other. More particularly, these coaxial springs are helical compression springs that are straight, i.e. that extend substantially rectilinearly.

Figure 13:
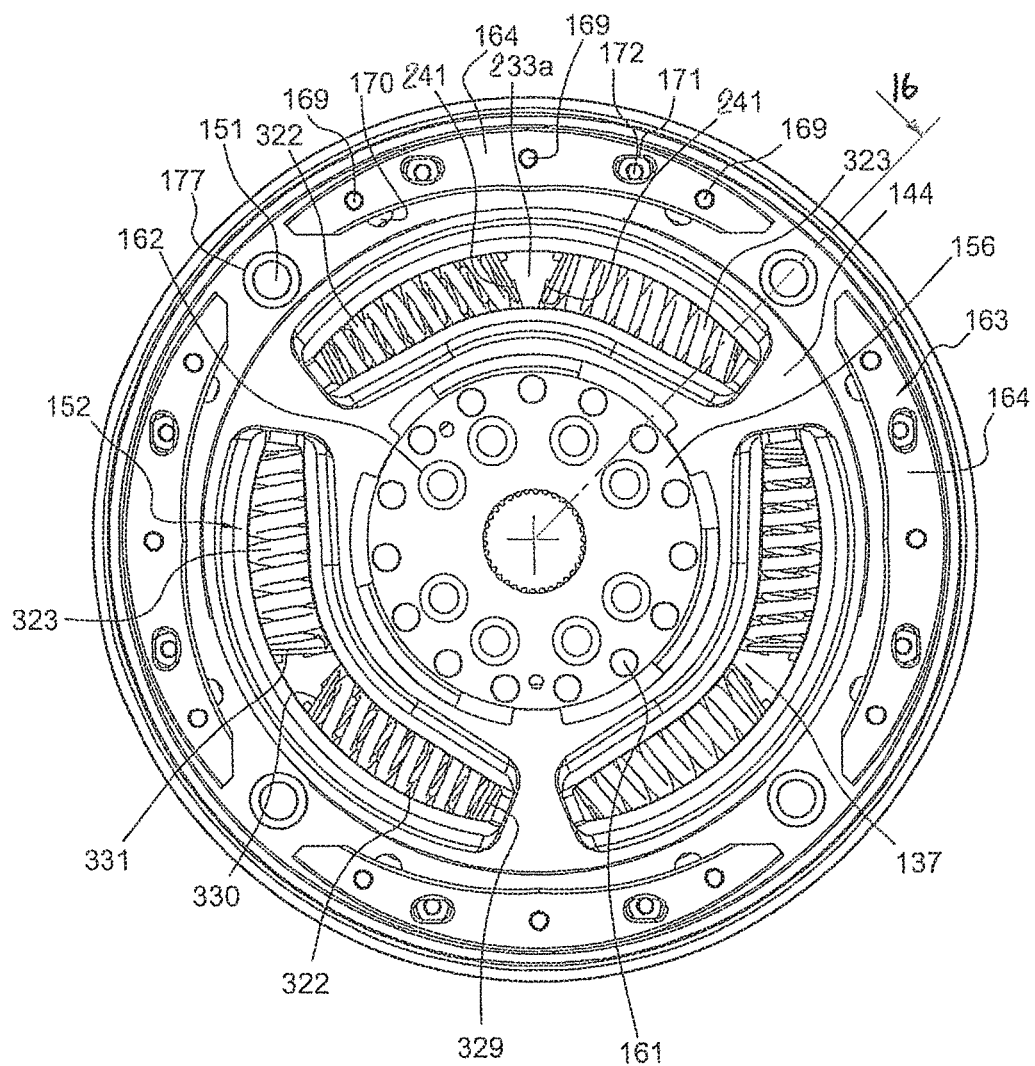
FIGS. 13 and 14 are views corresponding to FIGS. 11 and 12, respectively, and illustrating another embodiment of the invention.
Figure 14:
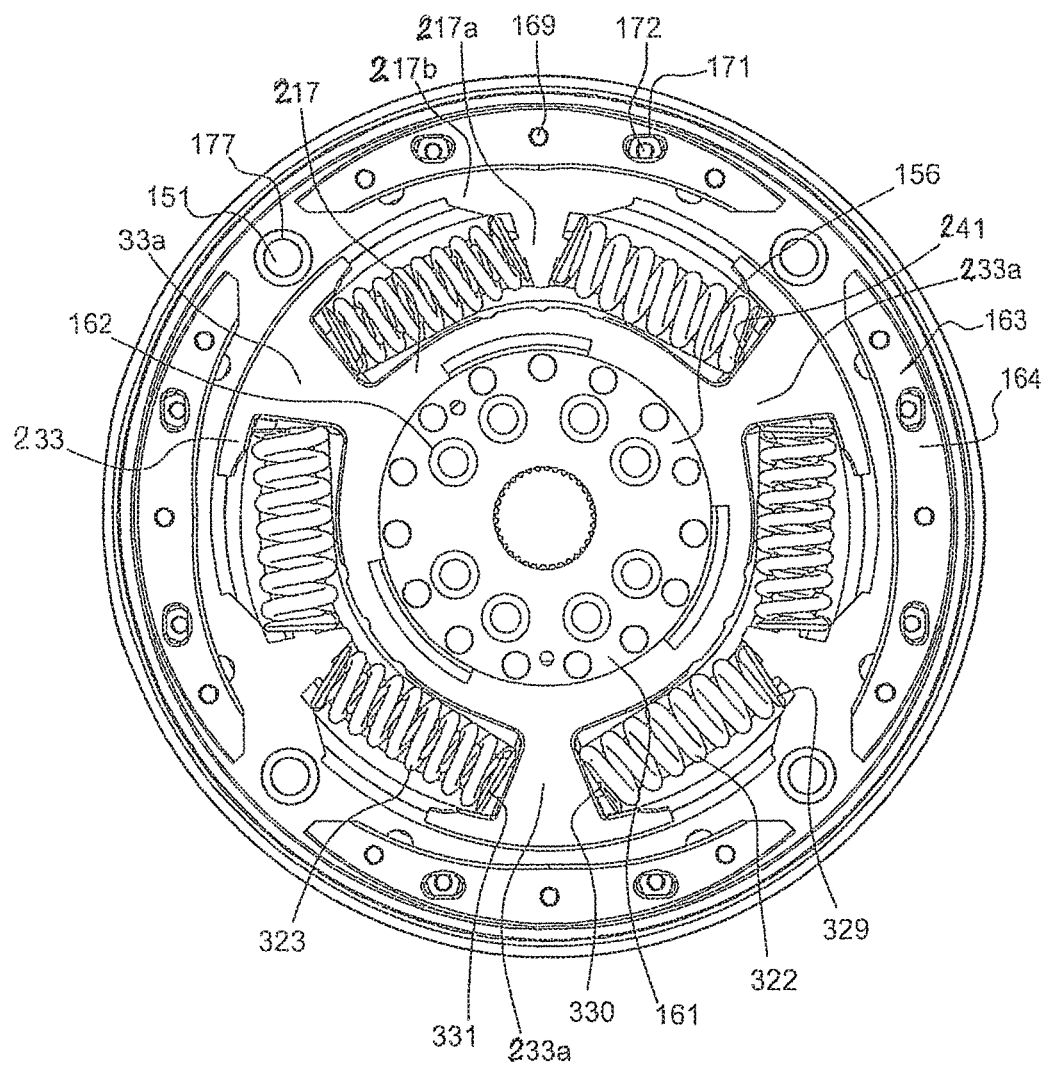

FIGS. 13, 14 and 16 illustrate a dual mass flywheel 301 of an embodiment of the invention that differs from the one presented in FIGS. 11, 12 and 15 in that elastic member 322, of lower stiffness, has two straight and coaxial helical springs. Elastic member 323, for its part, is constituted by a single straight spring whose stiffness K2 is greater than the stiffness K1 of elastic member 322.

In another embodiment that not depicted, the torque transmission device has no pendular damping means.

The invention claimed is:

1. A torque transmission device for a motor vehicle, the torque transmission device comprising:
   a torque input element;
   a torque output element; and
   at least one pair of elastic members mounted between the torque input and output elements and counteracting rotation of one of the input and output elements with respect to the other, the elastic members being arranged serially along substantially the same radius by a phasing member so that the elastic members deform in phase with one another;
   the stiffness K1 of the elastic member mounted between the torque input element and the phasing member is less than the stiffness K2 of the elastic member mounted between the phasing member and the torque output element, the ratio K2/K1 being equal to at least 2;
   one elastic member of the at least one pair of elastic members includes two coaxial helical springs mounted one inside the other.

2. The torque transmission device according to claim 1, wherein the ratio K2/K1 is between 2 and 5.

3. The torque transmission device according to claim 1, wherein is present in the form of a dual mass flywheel.

4. The torque transmission device according to claim 1, wherein the phasing member including at least one radially extending bracing member having two circumferentially opposite surfaces each bracing one of the at least one pair of elastic members.

5. The torque transmission device according to claim 4, wherein the torque input element includes an annular web having a radially inner annular part and at least one tab extending radially outward from the radially inner annular part.

6. The torque transmission device according to claim 5, wherein the at least one tab has two circumferentially opposite surfaces each supporting one of the at least two elastic members.

7. The torque transmission device according to claim 5, wherein the phasing member has two radial plates extending on either side of the annular web.

8. The torque transmission device according to claim 1, wherein the torque output element includes at least one guide washer extending radially and configured to accommodate the at least one pair of the elastic members.

9. The torque transmission device according to claim 8, further comprising a pendular damping member comprising at least one pendular mass mounted movably on the at least one guide washer.

10. The torque transmission device according to claim 8, wherein the torque output element includes two guide washers extending radially and fastened to one another so as to delimit between them an internal space accommodating the at least one pair of the elastic members.

11. The torque transmission device according to claim 10, further comprising a pendular damping member comprising at least one pendular mass mounted movably on one of the two guide washers.

12. The torque transmission device according to claim 1, wherein the at least one pair of the elastic members are disposed circumferentially opposite to each other relative to the phasing member.

13. The torque transmission device according to claim 1, wherein each of the two coaxial helical springs of the one elastic member of the at least one pair of the elastic members is a straight helical spring.

14. The torque transmission device according to claim 13, wherein another elastic member of the at least one pair of the elastic members includes a single helical spring.

15. The torque transmission device according to claim 14, wherein the single helical spring of the another elastic member of the at least one pair of the elastic members is a straight helical spring.

16. A torque transmission device for a motor vehicle, the torque transmission device comprising:
   a torque input element;
   a torque output element;
   at least one pair of elastic members mounted between the torque input and output elements and counteracting rotation of one of the input and output elements with respect to the other, the elastic members being arranged serially by a phasing member so that the elastic members deform in phase with one another; and
   a pendular damping member comprising at least one pendular mass mounted movably on the torque output element;
   the stiffness K1 of the elastic member mounted between the torque input element and the phasing member is less than the stiffness K2 of the elastic member mounted between the phasing member and the torque output element, the ratio K2/K1 being equal to at least 2;
   one elastic member of the at least one pair of elastic members includes two coaxial helical springs mounted one inside the other.

17. A torque transmission device for a motor vehicle, the torque transmission device comprising:
   a torque input element;
   a torque output element; and
   at least one pair of helical compression springs mounted between the torque input and output elements and counteracting rotation of one of the input and output elements with respect to the other, the helical compression springs being arranged serially by a phasing member so that the elastic members deform in phase with one another;
   the stiffness K1 of the helical compression spring mounted between the torque input element and the phasing member is less than the stiffness K2 of the helical compression spring mounted between the phasing member and the torque output element, the ratio K2/K1 being equal to at least 2;
   one helical compression spring of the at least one pair of helical compression springs includes two coaxial helical compression springs mounted one inside the other;
   at least one of the torque input element, the torque output element and the phasing member having stop element configured to limit the compression of the helical compression springs and prevent turns of the helical compression springs from becoming contiguous upon compression.

* * * * *